US012679531B2

(12) United States Patent
Fink et al.

(10) Patent No.: US 12,679,531 B2
(45) Date of Patent: \*Jul. 14, 2026

(54) ROTORCRAFT WITH A NON-RETRACTABLE WHEEL-TYPE LANDING GEAR

(71) Applicants: AIRBUS HELICOPTERS DEUTSCHLAND GMBH, Donauworth (DE); AIRBUS HELICOPTERS, Marignane Cedex (FR)

(72) Inventors: Axel Fink, Donauworth (DE); Aurelien Achard, Vitrolles (FR); Didier Bertin, Marseilles (FR)

(73) Assignees: AIRBUS HELICOPTERS DEUTSCHLAND GMBH, Donauworth (DE); AIRBUS HELICOPTERS, Marignane Cedex (FR)

( * ) Notice: Subject to any disclaimer, the term of this patent is extended or adjusted under 35 U.S.C. 154(b) by 392 days.

This patent is subject to a terminal disclaimer.

(21) Appl. No.: 18/231,709

(22) Filed: Aug. 8, 2023

(65) Prior Publication Data

US 2024/0182161 A1    Jun. 6, 2024

(30) Foreign Application Priority Data

Dec. 6, 2022    (EP) .................................... 22315307

(51) Int. Cl.
*B64C 25/60*        (2006.01)
*B64C 25/06*        (2006.01)
(Continued)

(52) U.S. Cl.
CPC .............. *B64C 25/60* (2013.01); *B64C 25/06* (2013.01); *B64C 25/34* (2013.01); *B64C 2025/325* (2013.01)

(58) Field of Classification Search
CPC ........ F16F 9/3235; B64C 25/36; B64C 25/38; B64C 25/58; B64C 25/60; B64C 2025/325
See application file for complete search history.

(56)            References Cited

U.S. PATENT DOCUMENTS 2,843,345 A    7/1958  Sikorsky
3,128,971 A    4/1964  Daffer
            (Continued)

FOREIGN PATENT DOCUMENTS

CN      211494436 U    9/2020
EP       3112254 A1    1/2017

OTHER PUBLICATIONS

The design of the Mi-8MTV helicopter; St. Petersburg University of Civil Aviation; Apr. 21, 2018). XP093040989.
(Continued)

*Primary Examiner* — Bradley T King
(74) *Attorney, Agent, or Firm* — BROOKS KUSHMAN P.C.

(57)            ABSTRACT

A rotorcraft with at least one non-retractable wheel-type landing gear and a fuselage comprising a lower shell, an inner floor, and at least one lower fuselage compartment arranged between the inner floor and the lower shell, wherein the at least one non-retractable wheel-type landing gear is rigidly attached in the at least one lower fuselage compartment and comprises: at least one wheel; a shock absorber connected to the at least one wheel and comprising a shock absorber tube and a shock absorber rod telescopically mounted to the shock absorber tube; at least two mounting arms extending laterally from the shock absorber
(Continued)

tube; and a mounting pin device extending laterally from the shock absorber tube and comprising a mounting pin connected to a floor fitting provided at the inner floor.

20 Claims, 3 Drawing Sheets

(51) Int. Cl.
B64C 25/34 (2006.01)
B64C 25/32 (2006.01)

(56) References Cited

U.S. PATENT DOCUMENTS

| | | | | |
|---|---|---|---|---|
| 3,547,425 | A | * | 12/1970 | Wachenheim .......... B64C 25/60 |
| | | | | 267/64.13 |
| 3,954,232 | A | | 5/1976 | Harper |
| 4,345,727 | A | * | 8/1982 | Brown .................... B64C 25/12 |
| | | | | 244/102 R |
| 4,730,817 | A | * | 3/1988 | Joseph ................... B60G 15/12 |
| | | | | 188/274 |
| 5,060,886 | A | | 10/1991 | Davis et al. |
| 12,304,621 | B2 | * | 5/2025 | Fink ........................ B64C 25/34 |
| 12,325,512 | B2 | * | 6/2025 | Fink ........................ B64C 25/36 |
| 2006/0237584 | A1 | * | 10/2006 | Hinton ................... B64C 25/10 |
| | | | | 244/102 R |
| 2024/0182160 | A1 | * | 6/2024 | Fink ........................ B64C 25/06 |
| 2024/0190557 | A1 | * | 6/2024 | Fink ........................ B64C 25/58 |
| 2024/0294251 | A1 | * | 9/2024 | Fink ........................ B64C 25/58 |

OTHER PUBLICATIONS

FAA-HANDBOOK "3-1 landing Gear Types"; pp. 1-96; Oct. 31, 2013. XP055336068.

European Search Report for European Application No. EP 22315307.3, Completed by the European Patent Office, Dated Apr. 26, 2023, 8 pages.

* cited by examiner

Fig. 4

ROTORCRAFT WITH A NON-RETRACTABLE WHEEL-TYPE LANDING GEAR

CROSS-REFERENCE TO RELATED APPLICATIONS

This application claims priority to European patent application No. EP 22315307.3 filed on Dec. 6, 2022, the disclosure of which is incorporated in its entirety by reference herein.

TECHNICAL FIELD

The disclosure is related to a rotorcraft with a fuselage that forms at least one lower fuselage compartment, and with at least one non-retractable wheel-type landing gear rigidly attached in the at least one lower fuselage compartment and extending at least partly through an opening formed in a lower shell of the rotorcraft.

BACKGROUND

In general, rotorcrafts are either provided with retractable or partially retractable landing gears, or with fixed, i.e., non-retractable landing gears. Retractable or partially retractable landing gears are usually embodied as wheel-type landing gears, while fixed, i.e., non-retractable landing gears are usually embodied as both skid-type landing gears or wheel-type landing gears.

Use of either a wheel-type landing gear or a skid-type landing gear for a given rotorcraft mostly depends on a respective size and weight of the given rotorcraft. More particularly, wheel-type landing gears are usually implemented with larger, i.e., medium-to-heavy rotorcrafts in order to allow for an improved ground handling of such larger rotorcrafts, while smaller, i.e., light-to-medium rotorcrafts are usually implemented with skid-type landing gears.

More specifically, a wheel-type landing gear of a conventional rotorcraft may either have a so-called tricycle-type layout or, less frequently, a so-called quadricycle-type layout. The tricycle-type layout is intended to enable resting of a given rotorcraft on three separate landing gears and refers to a configuration with either a single nose-wheel landing gear or a single tail-wheel landing gear. The single nose-wheel landing gear configuration, which is currently most used, features a single landing gear provided in a nose fuselage section of a given rotorcraft and two main landing gears provided in a rear fuselage section of the given rotorcraft. The single tail-wheel landing gear, instead, features a single landing gear provided in a tail section of a given rotorcraft and two main landing gears provided in a front section of the given rotorcraft.

If a given wheel-type landing gear is retractable or partially retractable, its nose/tail and main landing gears are totally or partially housed in forward flight operation of a given rotorcraft within associated landing gear compartments in order to substantially reduce a respective aerodynamic drag of the given rotorcraft, hence, enabling an increased flight speed while reducing fuel consumption and allowing for larger flight ranges. However, in contrast to fixed-wing applications the associated landing gear compartments of the given rotorcraft are usually not closed by trap doors in the forward flight operation, since an improvement of the respective aerodynamic drag that would be associated with closed trap doors does not prevail over an additional weight of such trap doors and their associated kinematics.

Nevertheless, in any case a respectively required retraction capability of the given wheel-type landing gear already results in an increase of design complexity of the given wheel-type landing gear and its kinematics and requires a comparatively large fuselage storage volume, hence, reducing available usable volume in the fuselage. Furthermore, a respective need for actuation, which is usually either electric or hydraulic, with its control and harnesses associated to retraction/expansion result in a weight increase of the given wheel-type landing gear and must be evaluated carefully against obtainable aerodynamic advantages.

However, as a general rule retractable or partially retractable wheel-type landing gears are deemed advantageous in terms of overall operational performance for fast rotorcrafts. Illustrative retractable or partially retractable wheel-type landing gears are described in the documents EP 3 112 254 A1 and U.S. Pat. No. 3,954,232 A.

Nevertheless, the simplicity and robustness, the compactness as well as the reduced weight of fixed, i.e., non-retractable wheel-type landing gears may lead to improved singular operational performances with larger useful volumes, larger payloads and less need for maintenance. Illustrative non-retractable wheel-type landing gears are described in the documents U.S. Pat. Nos. 2,843,345, 3,128, 971, 3,547,425, and 5,060,886.

More specifically, an important requirement for fixed, i.e., non-retractable wheel-type landing gears is linked to an underlying attachment design which should be developed in a way to avoid the non-retractable wheel-type landing gear of being involved into a respective overall elastic behavior of a given rotorcraft. This is especially the case with nose landing gears and main landing gears of non-retractable wheel-type landing gears, which are housed within an internal perimeter of the rotorcraft's fuselage. Such nose landing gears conventionally comprise a shock absorber connected to associated wheels, the shock absorber including a static shock absorber tube and a slidable shock absorber cylinder or rod which is telescopically mounted to the shock absorber tube. The shock absorber tube incorporates all required fixations and the shock absorber rod is connected to the associated wheels and travels inside the shock absorber tube during stroking. The shock absorber rod and the shock absorber tube are furthermore interconnected by a torque link which blocks relative axial rotation of both whilst providing for kinematic freedom for stroking.

Usually, an overall isostatic fixation of nose landing gears is provided, which avoids in a respective isostatic condition involvement of the rotorcraft's fuselage within the elastic deformation of a given nose landing gear and allows for an easy tolerancing management. In addition, respective attachments designs should be developed in a way to reduce as much as possible respective interface loads by ensuring adequate basis for moment reactions and to ensure a good accessibility to respective fixation parts for inspection and disassembly in a repair scenario.

A conventional attachment design for a nose landing gear of a rotorcraft usually involves the so-called tripod principle with two main fixation points on the nose landing gear's shock absorber and a third fixation point which is arranged at a predetermined distance away from the two main fixation points. The two main fixation points define a trunnion axis about which the nose landing gear would be able to rotate. Any rotation is, however, blocked by the third fixation point. This third fixation point is usually performed by means of a fixed, rigid rod providing for longitudinal support of the shock absorber. The rod is either installed below or above the main fixation points of the shock absorber and is either straight or inclined, usually attaching a structural floor and a structural frame of the rotorcraft via a specific bracket. The use of spherical bearings on the main fixation points and respective axial ends of the rod enables an overall isostatic fixation of the nose landing gear. The documents CN211494436, XP093040989 ("The design of the Mi-8MTV helicopter"; St. Petersburg University of Civil Aviation; 2018Apr. 21) and XP055336068 (FAA-HAND-BOOK "3-1 landing Gear Types"; pages 1-96; 2013 Oct. 31) were cited.

SUMMARY

It is an object of the present disclosure to provide a new rotorcraft with a fixed, i.e., non-retractable wheel-type landing gear and, more particularly, with a nose landing gear that provides for an improved weight efficiency and a decreased required installation volume, as well as improved reaction load paths into an associated fuselage of the new rotorcraft and simplified exchangeable attachment fittings which allow a comparatively good accessibility to respective fixations.

This object is solved by a rotorcraft with at least one non-retractable wheel-type landing gear. More specifically, the rotorcraft comprises a fuselage with a lower shell, an inner floor, and at least one lower fuselage compartment arranged between the inner floor and the lower shell, wherein the at least one lower fuselage compartment is equipped with a floor fitting provided at the inner floor and at least two lateral fittings. The at least one lower fuselage compartment is at least accessible via an opening formed in the lower shell and at least one non-retractable wheel-type landing gear is rigidly attached in the at least one lower fuselage compartment and extends at least partly through the opening formed in the lower shell. The at least one non-retractable wheel-type landing gear comprises at least one wheel and a shock absorber connected to the at least one wheel. The shock absorber comprises a shock absorber tube with an associated shock absorber tube length axis, and a shock absorber rod telescopically mounted to the shock absorber tube. The at least one wheel-type landing gear further comprises at least two mounting arms extending laterally from the shock absorber tube toward the at least two lateral fittings in the at least one lower fuselage compart-ment, wherein the at least two mounting arms are mounted to the at least two lateral fittings, and a mounting pin device extending laterally from the shock absorber tube and com-prising a mounting pin connected to the floor fitting pro-vided at the inner floor.

Advantageously, the rotorcraft according to the present disclosure comprises at least one non-retractable wheel-type landing gear with an improved design and attachment prin-ciple which is particularly, but not exclusively, suitable for application to a nose landing gear. The at least one non-retractable wheel-type landing gear outstands by its overall simplicity and light weight characteristics in comparison to conventional designs. In particular, no strut and its associ-ated fittings are required for fixation of the at least one non-retractable wheel-type landing gear.

More particularly, the improved design and attachment principle is based on provision of two main attachment points in a lower region of a shock absorber tube of the at least one non-retractable wheel-type landing gear, and a third attachment point in an upper region of the shock absorber tube. The two main attachment points are realized by at least two mounting arms extending laterally from the shock absorber tube, which are preferably connected to longerons of the rotorcraft's fuselage, i.e., airframe, which are principal structural elements of the airframe and essen-tially extend in a longitudinal direction of the rotorcraft. Thereby, the two mounting arms define a trunnion axis. A possible rotation of the at least one non-retractable wheel-type landing gear about this trunnion axis is, however, blocked by the third attachment point, which is preferably directly arranged at floor level of the rotorcraft without any additional rod. The third attachment point, which is also referred to hereinafter as the upper attachment point, is realized by using the mounting pin device that extends laterally from the shock absorber tube and comprises a mounting pin that extends upward toward the floor fitting provided at the inner floor. The inner floor is a structural element of the rotorcraft's fuselage.

Furthermore, a lower side of the shock absorber tube may be provided with a locking pad which is intended to block lateral, i.e., transversal motion of the shock absorber, hence, transferring lateral loads directly into a front frame or bulkhead and avoiding a disadvantageous and challenging transverse loading of main fittings provided at the two main attachment points. The locking pad is preferably caught by a corresponding fuselage or airframe fitting and blocks lateral motions, but keeps vertical motions free.

More specifically, the mounting pin device preferably comprises an intermediate fixation part formed e.g., as a device mounting arm into which the mounting pin may be integrated. Advantageously, the mounting pin device may be dismountable and, thus, easily be removed and exchanged e.g., in case of a damage or excessive wear of the mounting pin.

The mounting pin device may be incorporated into the at least one non-retractable wheel-type landing gear by fixation of the device mounting arm to the shock absorber tube such that the mounting pin extends preferably vertically from the shock absorber tube, i.e., the shock absorber, and perpen-dicular to a respective floor plane formed by the inner floor of the rotorcraft. This fixation may be accomplished by means of two spherical bearings, both preferably defining together a hinge axis which is arranged perpendicular to the floor plane formed by the inner floor. The spherical bearings are advantageously installed within the intermediate fixation part, i.e., the device mounting arm, but they may alterna-tively be installed on one or more respective mounting lugs provided on the shock absorber tube. Such mounting lugs may extend radially outward from an upper part of the shock absorber tube.

Since the mounting pin as upper support of the shock absorber is arranged near the top end of the shock absorber tube, there is a maximization of the vertical basis, i.e., the distance between the trunnion axis and an upper fixation unit, and consequently a reduction of interface loads which further reduces a respectively required weight of the upper fixation unit and associated reinforcements.

The mounting pin may be made of high-strength steel or titanium. The mounting pin's surface may be surface treated, coated or even protected by a bushing to improve wear and fretting resistance.

Preferably, the mounting pin is inserted at the floor plane into the upper fixation unit which is housed within the inner floor of the rotorcraft. Hence, the mounting pin holds the shock absorber tube and, thus, the shock absorber in place at the upper end of the shock absorber tube at the upper fixation unit. Integration of the upper fixation unit into the inner floor is advantageously compact and does not obstacle a respective inner volume of the rotorcraft's subfloor in contrast to conventional designs which require struts and other support elements, such as crossbeams, bulkheads, frames etc. Hence, a respectively available useful volume is maximized, allowing integration and easy access of equipment arranged in it.

More specifically, the upper fixation unit is preferably inserted into a corresponding opening provided in the inner floor of the rotorcraft, which is conveniently designed to react the mounting pin longitudinal load. The vertical position of the upper fixation unit is fixed by a preferably set of screws, advantageously being inserted and torqued from below. Hence, the upper fixation unit is entirely removable from the inner floor.

More particularly, the corresponding opening preferably comprises an adequate clearance fit allowing for an easy insertion and extraction of the upper fixation unit, as well as a proper load reaction capability from the upper fixation unit into the inner floor. The corresponding opening may by conveniently reinforced by an integral reinforcement ring with an adequate thickness. Due to a preferably relatively large diameter of the contact surface between the inner floor and the upper fixation unit, respective bearing contact loads are low. A respective vertical fixation of the upper fixation unit to the inner floor is preferably just accomplished by screws which are preferentially vertically oriented and have no load bearing function. As a result, the upper fixation unit can be easily extracted for inspection, repair or exchange, even interchange.

Moreover, the upper support of the at least one non-retractable wheel-type landing gear which is formed by the upper fixation unit is directly arranged in the inner floor, i.e., in the structural floor of the rotorcraft without being first transmitted by a strut. Thus, the reaction load at the upper fixation unit is in-plane with respect to the inner floor, which eliminates parasitic loads and an associated need of additional parts to react those parasitic loads. In fact, use of an inclined strut for conventional concepts requires the support of a vertical load and, hence, the additional support of a vertically stiff structural element, such as a crossbeam, a frame, or a bulkhead, which may advantageously be omitted in the at least one non-retractable wheel-type landing gear of the rotorcraft according to the present disclosure.

More specifically, required kinematic degrees of freedom and constraints of the mounting pin are achieved by a specific design of the upper fixation unit and fixation of the mounting pin device to the shock absorber. The upper fixation unit is inserted and fixed into the inner floor and preferably comprises a spherical pin bearing, and a socket. The mounting pin is inserted into the spherical pin bearing, thus, providing for freedom of rotations with respect to the inner floor, and it is able to slide in it, thus, providing for vertical freedom of motion with respect to the inner floor. Furthermore, the mounting pin is preferably hinged to the upper part of the shock absorber tube as described above by means of two spherical bearings, each having a bearing axis that is oriented in perpendicular to a respective mounting pin length axis of the mounting pin, and both together forming a hinge axis of the device mounting arm that is at least approximately arranged in parallel to the respective mounting pin length axis. The respective mounting pin length axis is preferably offset of the hinge axis and further offset of a respective shock absorber length axis. Thus, the mounting pin is able to rotate about the hinge axis by means of the device mounting arm providing for lateral freedom of movement of the mounting pin with respect to the shock absorber tube.

In summary, freedom of movement of the mounting pin is achieved by rotations and not by translations. In fact, only an axial sliding of the mounting pin along the length axis of the spherical pin bearing is by translation. However, providing degrees of freedom by rotations is more reliable than by providing degrees of freedom by translations.

As a result, the use of a hinged mounting pin device in combination with the spherical pin bearing of the upper fixation unit allows to obtain a required kinematic behavior at the upper attachment point. This behavior is essential facing the required isostatic condition of the overall landing gear integration and is characterized by a blockage of longitudinal motion alone whilst simultaneously ensuring a freedom of motion in lateral fuselage direction as well as in rotations. Hence, the upper attachment point transfers only longitudinal loads in longitudinal fuselage direction.

In an illustrative integration procedure for integrating the at least one non-retractable wheel-type landing gear into the rotorcraft, the shock absorber is initially guided upwards in the at least one lower fuselage compartment and the mounting pin of the mounting pin device is inserted into the spherical pin bearing of the upper fixation unit attached to the rotorcraft's inner floor. Then, lateral pins are inserted and attached at the at least two lateral fittings on the at least two mounting arms. Thus, no assembly procedure, such as torque wrenching, is required within the at least one lower fuselage compartment, just within the lower perimeter of the shock absorber tube which is easily accessible from below the rotorcraft. For a simplified and comfortable insertion of the mounting pin into the spherical pin bearing, the mounting pin is preferably shaped with a chamfered or rounded head provided for self-guidance. As the mounting pin has a length axis offset from the shock absorber tube length axis, a required visibility during the integration procedure of the mounting pin into the spherical pin bearing is advantageously further improved. In addition, there is no risk of jamming due to the rotation freedom provided by the spherical pin bearing.

According to some preferred embodiments, the mounting pin comprises a mounting pin length axis that is offset from the shock absorber tube length axis.

According to some preferred embodiments, the mounting pin device comprises a device mounting arm that is mounted via at least two spherical bearings to the shock absorber tube, and the mounting pin extends from the device mounting arm toward the floor fitting provided at the inner floor.

The shock absorber tube may comprise at least one lug to which the at least two spherical bearings are mounted, and the at least two spherical bearings may define a hinge axis that is offset from the shock absorber tube length axis.

Preferably, an offset between the shock absorber tube length axis and the mounting pin length axis is greater than an offset between the shock absorber tube length axis and the hinge axis.

The mounting pin device may be rotatable about the hinge axis.

According to some preferred embodiments, the rotorcraft further comprises a fixation unit mounted to the floor fitting provided at the inner floor, and the mounting pin is mounted to the fixation unit.

The fixation unit may comprise a socket that is rigidly attached to the inner floor, preferably by means of screws.

Furthermore, the fixation unit may comprise a spherical pin bearing accommodated in the socket, wherein the spherical pin bearing is mounted to the mounting pin.

The mounting pin may be slidable in the spherical pin bearing. More specifically, the mounting pin comprises associated length axis and may be slidable within the spherical pin bearing in direction of the associated length axis.

Furthermore, the fixation unit may comprise a cover that covers the fixation unit on a side pointing away from the mounting pin device.

According to some preferred embodiments, the mounting pin is rotatably mounted to the floor fitting provided at the inner floor.

According to some preferred embodiments, the shock absorber tube comprises a closed end and an axially opposed open end, wherein the open end is linked via a torque link to the shock absorber rod.

The torque link may comprise a torque arm pivotally mounted to a fixation provided on the shock absorber tube close to the open end.

The torque link may further comprise a mounting bracket pivotally mounted to both the torque arm and the shock absorber rod; wherein the mounting bracket is connected to a wheel axle of the at least one wheel.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

FIG. 4 shows an exploded view of the at least one non-retractable wheel-type landing gear of FIG. 2.

DETAILED DESCRIPTION

Figure 1:
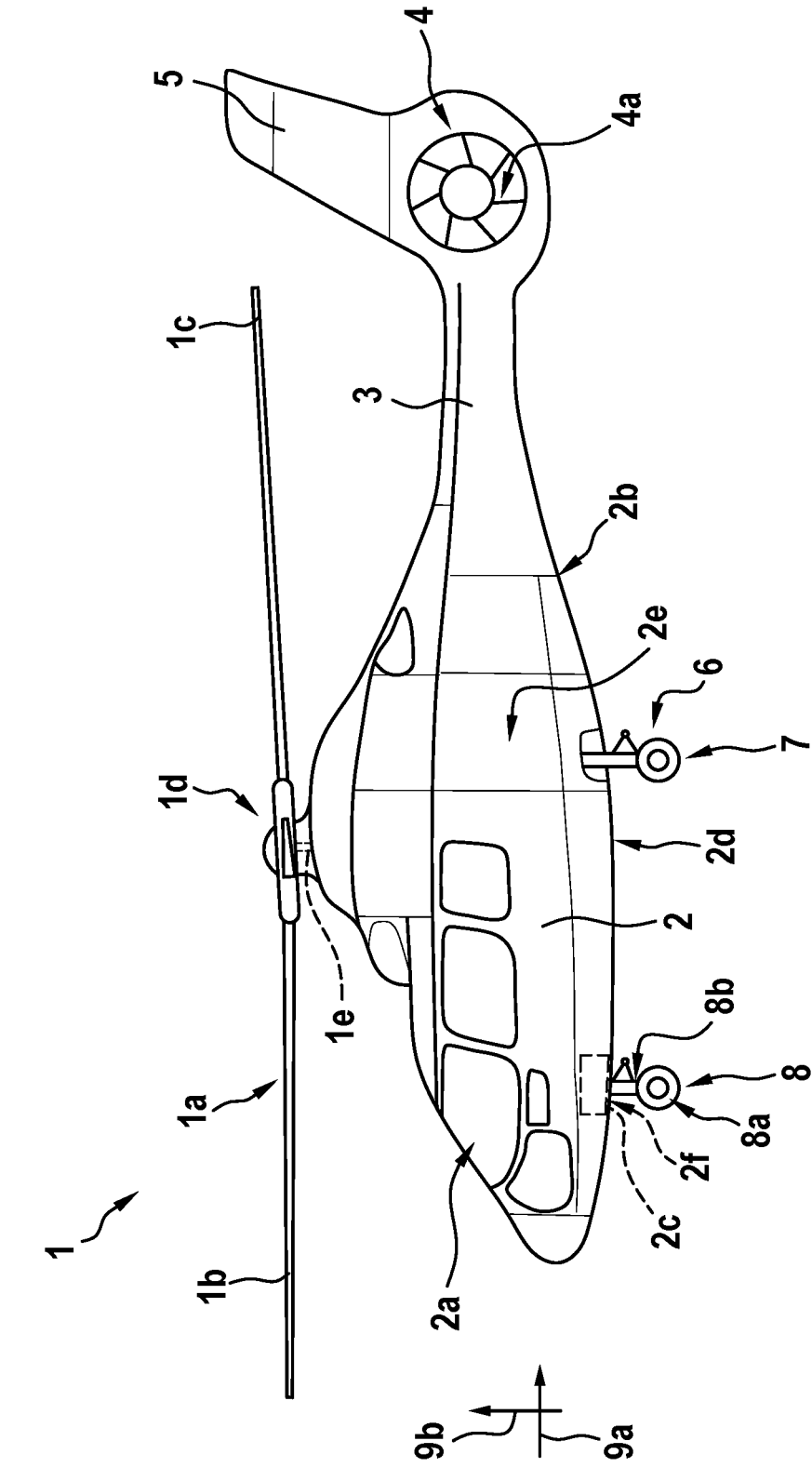
FIG. 1 shows a lateral view of a rotorcraft with at least one non-retractable wheel-type landing gear.

FIG. 1 shows a rotorcraft 1 that is exemplarily illustrated as a helicopter. Thus, for purposes of simplicity and clarity, the rotorcraft 1 is hereinafter referred to as the "helicopter 1".

Illustratively, the helicopter 1 comprises at least one main rotor 1*a* for providing lift and forward or backward thrust during operation. By way of example, the at least one main rotor 1*a* is embodied as a multi-blade main rotor that comprises a plurality of rotor blades 1*b*, 1*c* which are mounted at an associated rotor head 1*d* to a rotor shaft 1*e*, which rotates in operation of the helicopter 1 around an associated rotor axis.

The helicopter 1 further comprises a fuselage 2 on top of which the at least one main rotor 1*a* is located. Illustratively, the fuselage 2 forms a cabin 2*a* and a rear fuselage 2*b* and extends in a longitudinal direction 9*a*, a vertical direction 9*b*, and a transverse direction (9*c* e.g., in FIG. 2). The fuselage 2 is connected at the rear fuselage 2*b* to a tail boom 3. By way of example, the helicopter 1 further comprises at least one preferentially shrouded counter-torque device 4 which is located on the tail boom 3 and configured to provide counter-torque during operation, i.e., to counter the torque created by rotation of the at least one main rotor 1*a* for purposes of balancing the helicopter 1 in terms of yaw. The at least one counter-torque device 4 is illustratively provided at an aft section of the tail boom 3 and preferably comprises a tail rotor 4*a*. The aft section of the tail boom 3 preferably further comprises a fin 5.

More specifically, the fuselage 2 comprises at least a lower shell 2*d*, an inner floor (14 e.g., in FIG. 2), and at least one lower fuselage compartment 2*c* arranged between the inner floor and the lower shell 2*d*. The at least one lower fuselage compartment 2*c* is equipped with a floor fitting (14*d* e.g., in FIG. 3) provided at the inner floor and at least two lateral fittings (15 e.g., in FIG. 2). The lower shell 2*d* is connected to a side shell 2*e* and encases together with the latter the inner floor. Furthermore, the lower shell 2*d* forms an opening 2*f* through which the at least one lower fuselage compartment 2*c* is accessible.

Illustratively, the fuselage 2 is connected to a wheel-type landing gear 6 that comprises at least one fixed, i.e., non-retractable wheel-type landing gear 8 rigidly attached in the at least one lower fuselage compartment 2*c* and extending at least partly through the opening 2*f* formed in the lower shell 2*d*. The at least one fixed, i.e., non-retractable wheel-type landing gear 8 comprises at least one wheel 8*a*, illustratively so-called tandem wheels, and a shock absorber 8*b* connected to the tandem wheels 8*a*.

By way of example, the wheel-type landing gear 6 has a tricycle-type layout in which the at least one non-retractable wheel-type landing gear 8 implements a single nose landing gear. Thus, the at least one non-retractable wheel-type landing gear 8 is also referred to hereinafter as "the nose landing gear 8", for simplicity and brevity. Illustratively, the wheel-type landing gear 6 with the tricycle-type layout further comprises two fixed, i.e., non-retractable main landing gears 7.

Figure 2:
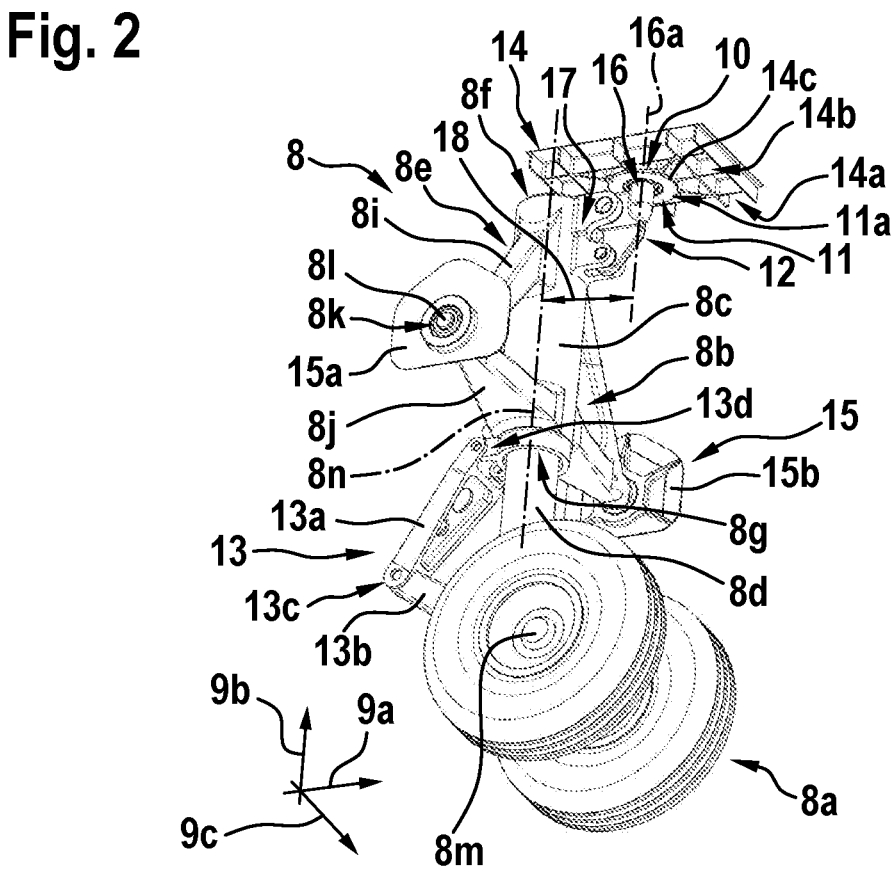
FIG. 2 shows a perspective view of the at least one non-retractable wheel-type landing gear of FIG. 1, with a shock absorber connected to an inner floor of the rotorcraft of FIG. 1.

FIG. 2 shows the nose landing gear 8 of FIG. 1 with the tandem wheels 8*a* and the shock absorber 8*b*, as well as a portion of an inner floor 14 of the fuselage 2 of FIG. 1 to which the shock absorber 8*b* is mounted. The inner floor 14 is illustrated from a lower side 14*a* and comprises an associated stiffening structure 14*b* that is equipped with a reinforcement ring 14*c*. The stiffening structure 14*b* is provided for reacting loads transferred into the inner floor 14. Furthermore, the longitudinal direction 9*a*, the vertical direction 9*b*, as well as a transverse direction 9*c* of the fuselage 2 of FIG. 1 are indicated and applied in analogy to the nose landing gear 8.

As described above at FIG. 1, the shock absorber 8*b* is connected to the tandem wheels 8*a*. Illustratively, the shock absorber 8*b* comprises a shock absorber tube 8*c* and a shock absorber rod 8*d* telescopically mounted to the shock absorber tube 8*c*. More specifically, the shock absorber tube 8*c* has an associated shock absorber tube length axis 8*n* and comprises an upper end 8*f* and an axially opposed lower end 8*g*. The lower end 8*g* is an open end via which the shock absorber rod 8*d* is introduced into the shock absorber tube 8*c*. The shock absorber rod 8*d* may also be referred to as a shock absorber cylinder.

Illustratively, the shock absorber tube 8*c* is mounted in the region of its upper end 8*f* to the inner floor 14 at an associated inner floor fixation 10, as described in more detail below at FIG. 3. The inner floor fixation 10 comprises a fixation unit 11 that is mounted to the inner floor 14. More specifically, the fixation unit 11 is rigidly attached to the inner floor 14 at the lower side 14*a*, preferably by means of screws 11*a*.

At least two and, by way of example, exactly two mounting arms 8*e* extend laterally from the shock absorber tube 8*c* in the transverse direction $9c$ toward at least two and, by way of example, exactly two lateral fittings 15 provided in the at least one lower fuselage compartment $2c$ of FIG. 1. The two mounting arms $8e$ are mounted to the two lateral fittings 15. More specifically, a first one of the two mounting arms $8e$ is mounted to a first lateral fitting $15a$, and a second one of the two mounting arms $8e$ is mounted to a second lateral fitting $15b$. Preferably, each one of the lateral fittings $15a$, $15b$ is separately mounted, e.g., structurally riveted, to an associated longeron of the fuselage 2 of FIG. 1.

Preferably, the two mounting arms $8e$ are identical, at least within predetermined manufacturing tolerances, and symmetrically arranged on diametrically opposed sides of the shock absorber $8b$, i.e., the shock absorber tube $8c$. Accordingly, only components of a single one of the two mounting arms $8e$ are provided with associated reference signs and representatively described in more detail below, for simplicity and brevity.

Illustratively, the mounting arm $8e$ comprises an upper mounting arm section $8i$ and a lower mounting arm section $8j$. By way of example, the lower mounting arm section $8j$ extends in the transverse direction $9c$, i.e., at least approximately perpendicularly away from the shock absorber tube $8c$ and is connected to the latter in the region of the lower end $8g$. The upper mounting arm section $8i$, in turn, is connected to the shock absorber tube $8c$ in the region of the upper end $8f$ and is kinked relative to the shock absorber tube $8c$ such that the upper mounting arm section $8i$ and the lower mounting arm section $8j$ intersect, thereby forming a triangular structure with the shock absorber tube $8c$. In this triangular structure, preferably a trunnion $8l$ is provided at the intersection of the upper mounting arm section $8i$ and the lower mounting arm section $8j$ for provision of a trunnion fixation $8k$ at the lateral fitting $15a$.

According to the present disclosure, the shock absorber tube $8c$ and, thus, the shock absorber $8b$ is connected via a mounting pin device 12 to the inner floor 14. Preferably, the mounting pin device 12 is dismountable and, thus, exchangeable if required.

More specifically, the mounting pin device 12 extends laterally from the shock absorber tube $8c$ and comprises a mounting pin 16 connected to a floor fitting ($14d$ e.g., in FIG. 3) provided at the inner floor 14. At least the mounting pin 16 may be made of high-strength steel or titanium. The mounting pin's outer surface may be surface treated, coated or even protected by a bushing to improve wear and fretting resistance.

Preferably, the mounting pin 16 is rotatably mounted to the floor fitting. The mounting pin 16 has a mounting pin length axis $16a$ that is offset from the shock absorber tube length axis $8n$ of the shock absorber tube $8c$ by a predetermined offset 18.

Illustratively, the shock absorber tube $8c$ comprises at least one mounting lug 17 that is preferably provided in the region of the upper end $8f$ of the shock absorber tube $8c$. The mounting pin device 12 is preferably mounted to the at least one mounting lug 17, as described below at FIG. 3.

The shock absorber tube $8c$ is preferably also linked via a torque link 13 to the shock absorber rod $8d$. Illustratively, the torque link 13 comprises a torque arm $13a$ pivotally mounted to a fixation $13d$ provided on the shock absorber tube $8c$ close to the lower end $8g$ of the shock absorber tube $8c$. The torque link 13 further comprises a mounting bracket $13b$ pivotally mounted to the torque arm $13a$ at an associated hinged connection $13c$. The mounting bracket $13b$ is further pivotally mounted to the shock absorber rod $8d$ via a mounting bracket hinge arranged in the region of a lower end ($8h$ in FIG. 4) of the shock absorber rod $8d$. Furthermore, the mounting bracket $13b$ is provided with a wheel axle bearing ($8p$ in FIG. 4) that rotatably receives a wheel axle $8m$ of the tandem wheels $8a$.

Figure 3:
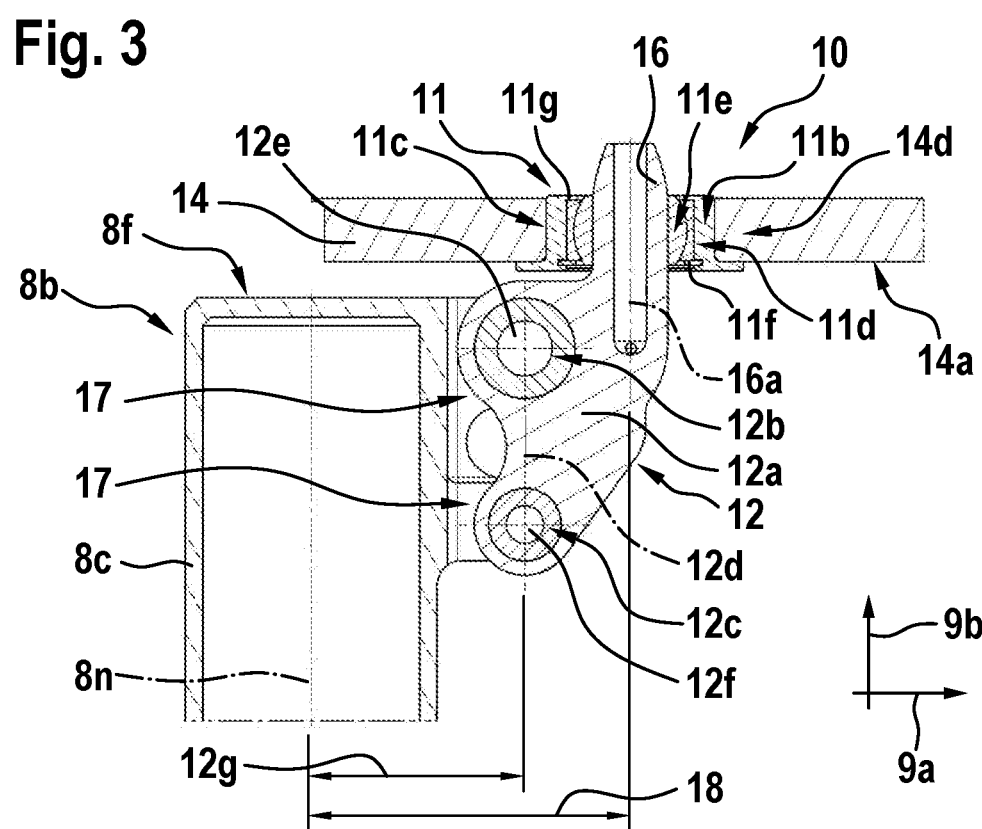
FIG. 3 shows a sectional view of a portion of the at least one non-retractable wheel-type landing gear of FIG. 2, seen in longitudinal direction of the rotorcraft of FIG. 1.

FIG. 3 shows the upper end $8f$ of the shock absorber $8b$ of FIG. 2 together with the inner floor 14 of FIG. 2, where the shock absorber $8b$ with the at least one lug 17 is mounted via the mounting pin device 12 of FIG. 2 to the inner floor fixation 10 which comprises the fixation unit 11 that is mounted to the inner floor 14. The shock absorber $8b$ comprises the shock absorber tube $8c$ with the shock absorber tube length axis $8n$. Similar to FIG. 2, the longitudinal direction $9a$ and the vertical direction $9b$ are indicated.

As described above at FIG. 2, the shock absorber $8b$ is connected to the fixation unit 11 at the inner floor 14 via the mounting pin 16 with the mounting pin length axis $16a$ of the mounting pin device 12. Illustratively, the mounting pin 16 is at least rigidly mounted to a device mounting arm $12a$ of the mounting pin device 12. Preferably, the device mounting arm $12a$ and the mounting pin 16 are integrally formed as a single component.

Preferably, the device mounting arm $12a$ is mounted via at least two spherical bearings to the shock absorber tube $8c$, illustratively an upper spherical bearing $12b$ and a lower spherical bearing $12c$. The upper spherical bearing $12a$ is preferably adapted for supporting larger loads than the lower spherical bearing $12b$. By way of example, the upper spherical bearing $12a$ is conveniently larger than the lower spherical bearing $12b$.

Illustratively, the upper spherical bearing $12b$ and the lower spherical bearing $12c$ are mounted to the at least one mounting lug 17 and define a hinge axis $12d$ that is offset from the shock absorber tube length axis $8n$ by an associated hinge axis offset $12g$. The associated hinge axis offset $12g$ is preferably smaller than the offset 18 of FIG. 2, i.e., the offset between the shock absorber tube length axis $8n$ and the mounting pin length axis $16a$. Furthermore, the upper spherical bearing $12b$ and the lower spherical bearing $12c$ may be kept in place at the at least one lug 17 via associated fixation bolts $12e$, $12f$.

Illustratively, the device mounting arm $12a$ extends laterally from the shock absorber tube $8c$ in the longitudinal direction $9a$ toward the mounting pin 16. The mounting pin 16, in turn, extends upward from the device mounting arm $12a$ in the vertical direction $9b$ toward the inner floor fixation 10.

Preferably, the inner floor fixation 10 comprises a floor fitting $14d$ provided at the inner floor 14, to which the fixation unit 11 is mounted. The fixation unit 11 may comprise a top cover $11g$ that covers the fixation unit 11 on a side pointing away from the shock absorber $8b$.

More specifically, the fixation unit 11 preferably comprises a socket $11b$ that is rigidly attached to the inner floor 14, preferably by means of the screws $11a$ of FIG. 2. The socket $11b$ may comprise an outer bearing surface $11c$ that fits to the floor fitting $14d$.

The fixation unit 11 may further comprise a spherical pin bearing $11e$ accommodated in the socket $11b$. Therefore, the socket $11b$ illustratively forms an accommodation $11d$ for the spherical pin bearing $11e$. The spherical pin bearing $11e$ may be secured in the socket $11b$ using a securing ring $11f$.

The spherical pin bearing $11e$ is mounted to the mounting pin 16. The mounting pin 16 is preferably slidable within the spherical pin bearing $11e$ in direction of the mounting pin length axis $16a$, and rotatable by means of the spherical pin bearing $11e$.

Figure 4:
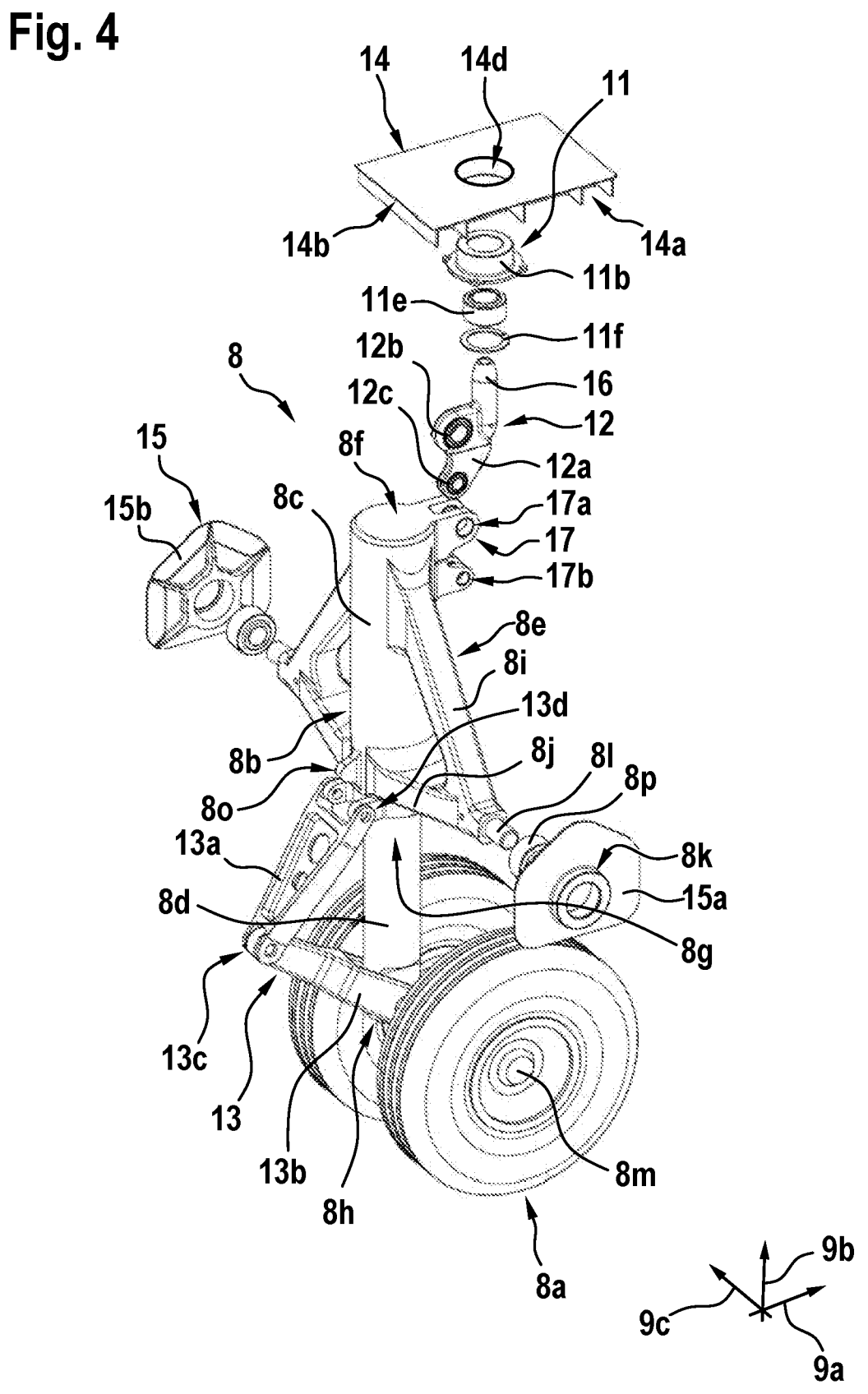

FIG. 4 shows the nose landing gear 8 with the tandem wheels 8a, the shock absorber 8b, the two mounting arms 8e, the mounting pin device 12, and the torque link 13, all of which are embodied as described above at FIG. 2 and FIG. 3, together with the inner floor 14 of FIG. 2 and FIG. 3. Similar to FIG. 2, the longitudinal direction 9a, the vertical direction 9b, as well as the transverse direction 9c are indicated.

As described above at FIG. 2, the shock absorber 8b comprises the shock absorber tube 8c with the two mounting arms 8e, and the shock absorber rod 8d telescopically mounted to the shock absorber tube 8c. The shock absorber 8b and, more specifically, the shock absorber tube 8c is connectable via the mounting pin device 12 to the fixation unit 11 at the inner floor 14. The two mounting arms 8e extend laterally from the shock absorber tube 8c in the transverse direction 9c and comprise the trunnions 8l for provision of trunnion fixations 8k at the two lateral fittings 15a, 15b.

FIG. 4 further illustrates trunnion bearings 8p which are provided for rotatably and slidably receiving the trunnions 8l of the two mounting arms 8e. FIG. 4 also further illustrates a lower end 8h of the shock absorber rod 8d, where the mounting bracket 13b of the torque link 13 is pivotally mounted to the shock absorber rod 8d.

Furthermore, as described above at FIG. 3 the shock absorber tube 8c comprises the at least one mounting lug 17 that is preferably provided in the region of the upper end 8f of the shock absorber tube 8c. The device mounting arm 12a of the mounting pin device 12 is mountable via the upper spherical bearing 12b and the lower spherical bearing 12c to the shock absorber tube 8c to the at least one mounting lug 17. Illustratively, the upper spherical bearing 12b is mountable to an upper lug 17a of the at least one mounting lug 17 and the lower spherical bearing 12c is mountable to a lower lug 17b of the at least one mounting lug 17.

Moreover, a locking pad 80 may be arranged on the shock absorber tube 8c between the two mounting arms 8e, e.g., in the region of the lower end 8g of the shock absorber tube 8c. The locking pad 80 may be provided for blocking lateral motion of the shock absorber 8b, i.e., motion of the shock absorber 8b in the transverse direction 9c, hence, transferring lateral loads directly into a front frame or bulkhead and avoiding a disadvantageous and challenging transverse loading of the two main fittings 15a, 15b.

It should be noted that modifications to the above described embodiments are within the common knowledge of the person skilled in the art and, thus, also considered as being part of the present disclosure. For instance, although the at least one non-retractable wheel-type landing gear is only described in the context of a nose landing gear in FIG. 2 to FIG. 4, the configuration and structure thereof may likewise be applied to one or more of the main landing gears 7 of FIG. 1. It should further be noted that in the context of the present description the term "non-retractable wheel-type landing gear" refers to a fixed landing gear which is statically and rigidly mounted to the fuselage of a rotorcraft and which may not be entirely or even partially be retracted into an associated storage compartment during flight operation of the rotorcraft.

REFERENCE LIST 1 rotorcraft
1a multi-blade main rotor
1b, 1c rotor blades
1d rotor head
1e rotor shaft
2 fuselage
2a cabin
2b rear fuselage
2c lower fuselage compartment
2d fuselage lower shell
2e fuselage side shell
2f compartment opening
3 tail boom
4 counter-torque device
4a tail rotor
5 fin
6 wheel-type landing gear
7 non-retractable main landing gear
8 non-retractable nose landing gear
8a tandem wheels
8b shock absorber
8c shock absorber tube
8d shock absorber rod
8e shock absorber mounting arms
8f shock absorber tube upper end
8g shock absorber tube lower end
8h shock absorber rod lower end
8i shock absorber tube upper mounting arm section
8j shock absorber tube lower mounting arm section
8k mounting arm main trunnion fixation
8l mounting arm trunnion
8m wheel axle
8n shock absorber length axis
80 locking pad
8p trunnion bearing
9a longitudinal direction
9b vertical direction
9c transverse direction
10 inner floor fixation
11 mounting pin fixation unit
11a mounting screws
11b fixation unit socket
11c socket outer bearing surface
11d bearing accommodation
11e pin bearing
11f securing ring
11g top cover
12 dismountable pin device
12a pin device mounting arm
12b upper spherical bearing
12c lower spherical bearing
12d hinge axis
12e, 12f fixation bolts
12g hinge axis offset
13 torque link
13a torque arm
13b mounting bracket
13c hinged connection
13d torque link fixation
14 inner floor
14a inner floor lower side
14b inner floor stiffening structure
14c reinforcement ring
14d upper floor fitting
15 lateral mounting arm trunnion fittings
15a, 15b lateral mounting arm trunnion fitting
16 mounting pin
16a pin length axis
17 shock absorber tube lug
17a upper tube lug
17b lower tube lug
18 axes offset

What is claimed is:

1. A rotorcraft with a fuselage comprising a lower shell, an inner floor, and at least one lower fuselage compartment arranged between the inner floor and the lower shell, wherein the at least one lower fuselage compartment is equipped with a floor fitting provided at the inner floor and at least two lateral fittings, and wherein the at least one lower fuselage compartment is at least accessible via an opening formed in the lower shell, the rotorcraft comprising:

at least one non-retractable landing gear rigidly attached in the at least one lower fuselage compartment and extending at least partly through the opening formed in the lower shell, comprising:

at least one wheel;

a shock absorber connected to the at least one wheel, comprising:

a shock absorber tube with an associated shock absorber tube length axis, and a shock absorber rod telescopically mounted to the shock absorber tube;

at least two mounting arms extending laterally from the shock absorber tube toward the at least two lateral fittings in the at least one lower fuselage compartment, wherein the at least two mounting arms are mounted to the at least two lateral fittings; and a mounting pin device extending laterally from the shock absorber tube and comprising a mounting pin connected to the floor fitting provided at the inner floor.

2. The rotorcraft of claim 1, wherein the mounting pin comprises a mounting pin length axis that is offset from the shock absorber tube length axis.

3. The rotorcraft of claim 1, wherein the mounting pin device comprises a device mounting arm that is mounted via at least two spherical bearings to the shock absorber tube; and wherein the mounting pin extends from the device mounting arm toward the floor fitting provided at the inner floor.

4. The rotorcraft of claim 3, wherein the shock absorber tube comprises at least one lug to which the at least two spherical bearings are mounted; and wherein the at least two spherical bearings define a hinge axis that is offset from the shock absorber tube length axis.

5. The rotorcraft of claim 4, wherein an offset between the shock absorber tube length axis and the mounting pin length axis is greater than an offset between the shock absorber tube length axis and the hinge axis.

6. The rotorcraft of claim 4, wherein the mounting pin device is rotatable about the hinge axis.

7. The rotorcraft of claim 1, further comprising a fixation unit mounted to the floor fitting provided at the inner floor, wherein the mounting pin is mounted to the fixation unit.

8. The rotorcraft of claim 7, wherein the fixation unit comprises a socket that is rigidly attached to the inner floor.

9. The rotorcraft of claim 8, wherein the fixation unit comprises a spherical pin bearing accommodated in the socket; and wherein the spherical pin bearing is mounted to the mounting pin.

10. The rotorcraft of claim 9, wherein the mounting pin is slidable in the spherical pin bearing.

11. The rotorcraft of claim 7, wherein the fixation unit comprises a cover that covers the fixation unit on a side pointing away from the mounting pin device.

12. The rotorcraft of claim 7, wherein the mounting pin is rotatably mounted to the floor fitting provided at the inner floor.

13. The rotorcraft of claim 1, wherein the shock absorber tube comprises a closed end and an axially opposed open end, and wherein the open end is linked via a torque link to the shock absorber rod.

14. The rotorcraft of claim 13, wherein the torque link comprises a torque arm pivotally mounted to a fixation provided on the shock absorber tube close to the open end.

15. The rotorcraft of claim 14, wherein the torque link comprises a mounting bracket pivotally mounted to both the torque arm and the shock absorber rod; and wherein the mounting bracket is connected to a wheel axle of the at least one wheel.

16. The rotorcraft of claim 8, wherein the socket is rigidly attached to the inner floor by screws.

17. A rotorcraft with a fuselage comprising a lower shell, an inner floor, and a lower fuselage compartment arranged between the inner floor and the lower shell, wherein the lower fuselage compartment has a floor fitting at the inner floor and two lateral fittings, and wherein the lower fuselage compartment is accessible via an opening in the lower shell, the rotorcraft comprising:

a non-retractable landing gear rigidly attached in the lower fuselage compartment and extending through the opening in the lower shell, comprising:

a wheel;

a shock absorber connected to the wheel, comprising:

a shock absorber tube with an associated shock absorber tube length axis, and a shock absorber rod telescopically associated with the shock absorber tube;

two mounting arms extending laterally from the shock absorber tube toward the two lateral fittings in the lower fuselage compartment, wherein the two mounting arms are mounted to the two lateral fittings; and a mounting pin device extending laterally from the shock absorber tube and comprising a mounting pin connected to the floor fitting.

18. The rotorcraft of claim 17, wherein the mounting pin comprises a mounting pin length axis that is offset from the shock absorber tube length axis.

19. The rotorcraft of claim 17, wherein the mounting pin device comprises a device mounting arm mounted via two spherical bearings to the shock absorber tube; and wherein the mounting pin extends from the device mounting arm toward the floor fitting provided at the inner floor.

20. The rotorcraft of claim 19, wherein the shock absorber tube comprises a lug to which the two spherical bearings are mounted; and wherein the two spherical bearings define a hinge axis offset from the shock absorber tube length axis.

* * * * *